H. S. DODD.
AUTOMATIC VALVE FOR CONTROLLING THE FLOW OF GASEOUS MIXTURES.
APPLICATION FILED MAY 14, 1918.
1,311,328.
Patented July 29, 1919.
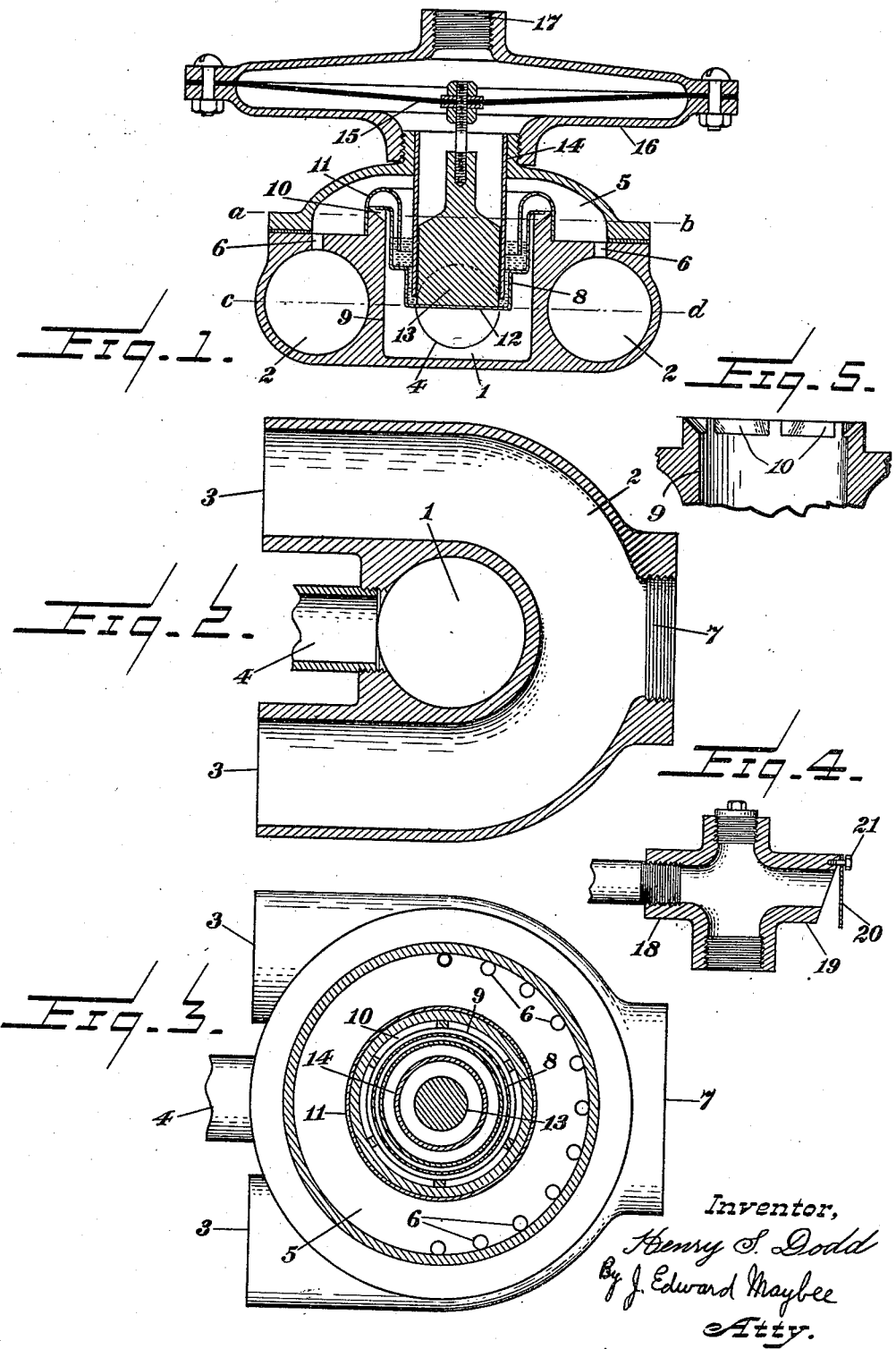

UNITED STATES PATENT OFFICE.

HENRY S. DODD, OF TORONTO, ONTARIO, CANADA, ASSIGNOR, BY MESNE ASSIGNMENTS, OF ONE-HALF TO JOHN O'NEILL, OF TORONTO, ONTARIO, CANADA.

AUTOMATIC VALVE FOR CONTROLLING THE FLOW OF GASEOUS MIXTURES.

1,311,328.   Specification of Letters Patent.   Patented July 29, 1919.

Application filed May 14, 1918. Serial No. 234,562.

*To all whom it may concern:*

Be it known that I, HENRY STANSFIELD DODD, of 313 Eglinton avenue, in the city of Toronto, county of York, Province of Ontario, Canada, engineer, a subject of the King of Great Britain, have invented certain new and useful Improvements in Automatic Valves for Controlling the Flow of Gaseous Mixtures, of which the following is a specification.

This invention relates to valves adapted to control the flow of one fluid by variations in the pressure of another fluid, and more particularly to valves adapted to shut off the flow of gas to the burner of heaters of the type shown and described in my co-pending application No. 234,563 filed May 14th, 1918, in which a slight vacuum is maintained in the heater while it is in operation, and it is necessary to cut off the gas whenever the pressure in the combustion chamber of the heater rises substantially to that of the atmosphere, and my object is to devise a valve which will be simple, reliable and practically frictionless, and which preferably will cut off the flow of gas slightly before the pressure in the heater rises to that of the atmosphere and maintain it off until the pressure has again fallen to substantially the same point.

I attain my objects by means of the constructions hereinafter described and illustrated in the accompanying drawings in which—

Figure 1 is a vertical section of my improved valve;

Fig. 2 a section on the line $c$—$d$ in Fig. 1;

Fig. 3 a section on the line $a$—$b$ in Fig. 1; and

Fig. 4 a section of the controlling device for the valve.

Fig. 5 is a vertical section of part of the wall of the mercury chamber.

In the drawings like numerals of reference indicate corresponding parts in the different figures.

1 is a gas chamber, which is at least partly surrounded by the mixing chamber 2. This mixing chamber is preferably of horse shoe shape. Air inlets 3 are formed at the end of each branch, and opposite the air inlets is formed the mixture outlet 7, (see particularly Fig. 2). Between the branches the gas chamber is provided with the gas inlet 4. Above the mixing chamber is formed the intermediate gas chamber 5 communicating by means of the gas inlets 6 with the interior of the mixing chamber.

Within the upper part of the gas chamber is located the mercury chamber 8. This is preferably stamped up from sheet metal and is arranged so that it may be supported on the annular wall 9 formed at the inner side of the intermediate chamber 5. The wall of the mercury chamber is slightly spaced from the wall 9 so that a passageway for gas is formed between the two. The upper edge of the wall is provided with a series of notches 10 through which the gas passes under the flange of the mercury chamber.

11 is an annular sealing flange, which depends on the mercury chamber and is U-shaped in vertical section to fit over the wall 9 and make a gas tight fit therewith. This sealing flange is spaced from the wall of the mercury chamber so that a passageway for gas is formed from the gas chamber between the wall 9 and the wall of the mercury chamber through the notches 10, between the sealing flange 11 and the wall of the mercury chamber, thence through the upper part of the mercury chamber through the intermediate chamber 5 to the gas inlets 6 leading into the mixing chamber. This passageway, it is evident, can be sealed by displacing mercury in the mercury chamber so that it rises above the level of the lower end of the sealing flange 11. A suitable quantity of mercury is contained in the mercury chamber, the lower part 12 of which is preferably reduced in diameter as shown to economize mercury.

Within the mercury chamber a plunger 13 is adapted to rise and fall, being preferably guided by a tube 14 and secured to the upper wall of the intermediate gas chamber 5. This plunger is secured to a diaphragm 15 secured in the ordinary manner to the diaphragm chamber 16. The upper part of the diaphragm chamber is provided with the opening 17 with which will be connected a pipe leading to any chamber containing the fluid whose pressure it is designed shall cause the operation of the valve. In particular, the diaphragm chamber is intended to be connected with the interior of a heater such as described and shown in the application hereinbefore referred to. Preferably there is connected with the diaphragm chamber by means of a nipple a device such as illustrated in Fig. 4.

The weight of the plunger will ordinarily be so adjusted that it will not fall and displace the mercury sufficiently to cut off the gas supply until the pressure in the upper part of the diaphragm chamber has risen to that of the atmosphere. It is desirable, however, when the device is used with a heater such as hereinbefore described to so arrange it that the gas supply shall be cut off just before the pressure in the upper part of the diaphragm chamber reaches that of the atmosphere and so that the plunger will not rise again until the pressure in the upper part of the diaphragm chamber falls below that at which it opened.

The controller shown in Fig. 4 is preferably designed to be screwed on a nipple screwed into the opening in the upper part of the diaphragm chamber and is preferably of T-form. One branch 18 of the T is designed for the connection of a pipe leading to a chamber containing fluid whose pressure is to control the valve. The opposite branch 19 of the T has its face inclined inwardly and a flap 20 is hingedly connected at the top of the same, preferably by means of a pin 21 passing loosely through a hole in the flap. This flap is of sufficient weight so that it will fall away from the end of the branch T just before the pressure in the upper part of the diaphragm chamber rises to that of the atmosphere, and will not close again until the pressure has fallen below that at which the flap opened.

It is further obvious that by varying the weight of the flap the interior of the controlling device, and therefore the upper part of the diaphragm chamber can be opened to the atmosphere at varying pressures as may be predetermined. The advantage of this arrangement is that if the device is used with a gas heater of the type described that a scavenging flow of fresh air may be obtained through the heater after the gas supply has been cut off and before it is again turned on, so that an atmosphere capable of sustaining the flame of a pilot light is insured in the heater.

The operation of the device will be reasonably clear from the description that has gone before, and but a brief description of the general operation will be necessary. In practice the mixture outlet will be connected with the chamber of the heater in which suction is maintained. Consequently as long as the valve is open air will be drawn through the inlet 3 and mixed with gas entering through the inlet 6, the mixture passing out through the mixture outlet 7. The instant, however, the pressure in the upper part of the diaphragm chamber rises nearly to that of the atmosphere, the plunger 13 descends and displaces the mercury in the mercury chamber, thus effectively sealing the gas passage from the gas chamber as shown in Fig. 1. The descent of the plunger will be very sudden the instant that the flap 20 opens. As soon as the pressure in the upper part of the diaphragm chamber falls a little below that at which the flap 20 opened, the flap will again close and the plunger will be suddenly lifted, thus reëstablishing the flow of gas to the mixing chamber.

What I claim as my invention is:—

1. In a valve, the combination of an airtight diaphragm chamber; a diaphragm therein; the chamber above the diaphragm being provided with an opening for connection with a chamber containing a fluid whose pressure is to cause the operation of the valve; a fixed mercury chamber below the diaphragm chamber; a plunger attached to the diaphragm adapted to displace mercury in the mercury chamber; a mixing chamber provided with air and gas inlets and a mixture outlet; a gas chamber provided with a gas inlet and with a gas passage therefrom leading to the gas inlet of the mixing chamber, said passages being adapted to be sealed by the displacement of the mercury as aforesaid.

2. In a valve, the combination of a mixing chamber provided with an air inlet, a gas inlet and a mixture outlet; a central gas chamber provided with a gas inlet; a fixed mercury chamber substantially concentric with the gas chamber and in communication with the gas inlet aforesaid; an annular sealing flange extending down into the mercury chamber, a gas passage being formed between the wall of the gas chamber and the wall of the mercury chamber and between the sealing flange and the wall of the mercury chamber; mercury in the mercury chamber adapted to be displaced to seal the said passage; a plunger adapted to displace the mercury; an airtight diaphragm chamber; and a diaphragm therein to which the plunger is connected, the chamber above the diaphragm being provided with an opening for connection with a chamber containing a fluid whose pressure is to cause the operation of the valve.

3. In a valve, the combination of a mixing chamber provided with an air inlet, a gas inlet and a mixture outlet; a gas chamber provided with a gas inlet and with a gas passage leading therefrom to the gas inlet of the mixing chamber; means controlled by fluid pressure for opening and closing said gas passage including a passage through which fluid pressure is led to said means, said passage having an opening to the atmosphere; and a closure for said opening tending to open when the pressure in said passage is slightly below that of the atmosphere and to close again when the pressure falls below that at which it opened.

4. In a valve, the combination of a gas chamber provided with a gas inlet; a mixing chamber at least partly surrounding the gas chamber, provided at one side with an air inlet, at the other side with a mixture outlet, and at the top with a series of gas inlets, an intermediate chamber with which said gas inlets communicate; a mercury chamber communicating with the intermediate chamber; a gas passage between the mercury chamber and the gas chamber; mercury in the mercury chamber adapted to be displaced to seal the said passage; a plunger adapted to displace the mercury; a diaphragm chamber; and a diaphragm therein to which the plunger is connected, the chamber above the diaphragm being provided with an opening for connection with a chamber containing a fluid whose pressure is to cause the operation of the valve.

5. In a valve, the combination of a gas chamber provided with a gas inlet; a mixing chamber of horse-shoe shape disposed about the gas chamber and having an air inlet at the end of each branch, a mixture outlet at its opposite end, and at the top with a series of gas inlets; an intermediate chamber with which said gas inlets communicate; a mercury chamber communicating with the intermediate chamber; a gas passage between the mercury chamber and the gas chamber; mercury in the mercury chamber adapted to be displaced to seal the said passage; a plunger adapted to displace the mercury; a diaphragm chamber; and a diaphragm therein to which the plunger is connected, the chamber above the diaphragm being provided with an opening for connection with a chamber containing a fluid whose pressure is to cause the operation of the valve.

Signed at Toronto, Canada, this 1st day of May, 1918.

HENRY S. DODD.

Copies of this patent may be obtained for five cents each, by addressing the "Commissioner of Patents, Washington, D. C."